United States Patent Office 3,080,236
Patented Mar. 5, 1963

3,080,236
INSTANT YOGHURT
Edgar A. Ferguson, Jr., 150 Woodruff Ave., Brooklyn, N.Y.
No Drawing. Filed Dec. 13, 1960, Ser. No. 75,471
10 Claims. (Cl. 99—59)

This invention relates to a new and improved yoghurt. More particularly it is concerned with the formulation of a yoghurt which can be stored as a powder and instantly reconstituted by admixture with water. As a further object of this invention an improved yoghurt having finer qualities of flavor and smoothness will be described.

Previous attempts to manufacture yoghurt in powder form has resulted in nothing more than a culture which could be implanted in milk and allowed to grow quickly and vigorously in a type of "do-it-yourself" yogurt manufacture. These attempts at rapid manufacture of yoghurt have resulted in poorly controlled growth conditions which yielded inferior quality and taste.

One of the great disadvantages of this type of yoghurt culture has been that it could not be made with a normal fat content for yoghurt; the normal fat content for yoghurt being one-half that of whole milk. The reason has been that a powder so made had poor shelf-life. The product of the present invention has a normal fat content for yoghurt and a long shelf-life.

The superiority of the present invention is found in the ability to prepare the product by admixture with tap water at ordinary temperatures resulting in a product of superior taste and uniformity.

The basic theory behind the use of yoghurt has been to implant a beneficial culture of *Bacillus bulgaricus-Lactobacillus acidophilus* in a milk, to allow this milk to incubate until these particular species of bacilli sour the milk, and then chill the milk to prevent further growth. When this is consumed these bacilli pass unharmed through the stomach because these particular species favor an acid medium and are therefore not killed by the gastric juice. When these bacteria find their way into the intestine they may implant a favorable flora and in any case, whether the implant is made or not, beneficial vitamins are ingested as a result of the growth of the bacteria. The use of yoghurt has become quite popular and common as it forms not only a healthful but a pleasant food substance which may be taken for its flavor, its health qualities, or its reputed regulatory effect on bowel movements.

When yoghurt in its usual form is dehydrated it cannot be reconstituted into the smooth, creamy, pleasant tasting product by the simple addition of water as might be expected. To overcome this difficulty the process of the present invention comprises drying the culture of yoghurt in a vacuum dryer, and powdering the residue to be used as a partial ingredient of an instant yoghurt product. Preferably the dried, powdered culture residue is prepared from a culture which has been overgrown to some extent.

The dried, powdered yoghurt culture is then mixed with powdered milk (skimmed milk, non-fat milk, or the like), and with starch, preferably dried, cooked starch, to form the composition of the present invention. Flavorings, sweeteners, or the like, may be added as desired. When this composition is mixed with water a yoghurt-like composition is instantly formed. The resulting product looks, tastes and acts like yoghurt in all respects.

The dried composition of the present invention can be stored indefinitely, particularly in a sealed container and used as desired to give the instant yoghurt. When the composition is mixed with water it is best to stir it, preferably with an egg beater or the like to give a product of the creamiest possible consistency.

In preparing compositions according to the invention it is preferred to use ingredients which are specially prepared to give the best results in the compositions.

The dried skimmed milk used should be instantly soluble. This type of milk powder is the type prepared by spray drying for a second time. Dried milk which has been rehydrated in such manner to form a concentrated liquid and then subjected to a second spray drying so aerates the milk powder that it becomes instantly soluble. While other spray dried products may be used this is the most desirable form. It is most preferred to use an amount of 35% of the composition; preferably a maximum of 50% and a minimum of 20% may be used.

Dextrose is the preferred sugar to be used as a sweetener because it gives a smoother product than other sugars, though other sugars may of course be used. The dextrose used should preferably be in the form of a coarse powder. Finer powders tend to pack and form lumps while being mixed. Other sugars such as saccharose, beta lactose, etc. may be used but the product providing the most desirable characteristics from the standpoint of the degree of sweetness and stiffness is dextrose. Most desirably 18% of dextrose is used in the formula. It may be omitted or used in twice this quantity, according to taste.

The starch which is needed to give a final yoghurt of sufficient body is preferably the type known as precooked starch. Precooked starch is manufactured by boiling a concentrated solution of starch until the natural granules break apart. This product, is then spray dried and will, unlike ordinary starch, dissolve in cold water instantly. If natural starch were used the product would have to be boiled in order to dissolve the starch. The most desirable amount is 18%, a minimum of 10%, and a maximum of 25% may be used.

Sodium alginate may also be used to provide body for the final product. Sodium alginate of mesh 200 is most desirable. Other mesh sizes may be used but the finer mesh sizes tend to pack and form lumps whereas larger sizes do not dissolve readily. The most desirable amount is 0.9%. It may be omitted but its presence is most desirable. An amount up to 5% may be used.

Calcium acetate and citric acid powders of food quality must be used. It is particularly important to make note that the heavy metal content of these powders is not more than a few parts per million. 0.7% of calcium acetate is most desirable. It may be omitted but desirable characteristics such as instant jelling and rapid dispersion of the starch may be sacrificed. Larger amounts up to 2% may be used. Citric acid is most desirably used in a quantity of 1.5%. It may be omitted or used in a quantity up to 2.5%.

Vegetable oil is subject to rancidity. If corn oil is used, a deodorized and decolorized variety should be chosen and shelf-life tests should be made to determine whether the particular grade of oil is suitable for the purpose intended.

An important component of the composition of the present invention in order to give the resulting product the appearance and taste of yoghurt is a fat of some type. Where whole dried milk is used as the milk component, instead of dried skimmed milk, the fat may be omitted entirely, or only a reduced amount used. However, when dried skimmed milk is used a fat is necessary.

It is preferred to use vegetable oil as the fat component. Of all vegetable oils of edible grade which are economically desirable, coconut oil has been shown to have the best shelf-life. The percentage of coconut oil is determined by the amount which, in the final hydrated form, is approximately one-half the butter fat content of whole milk. In the dry form it is most desirably 9.5%. It may be increased to 19% to give a butter fat content equivalent to whole milk in the final product; but, further reduction of the percentage by more than one or two percentage points where dried skimmed milk is used yields a product of undesirable taste characteristics.

Yoghurt powder, prepared in accordance with the directions given in the examples is used in a percentage most desirably of 18%. The amount used is controlled by the substantial amount of culture usually found in yoghurt produced by the usual methods of procedure. Thus, in accordance with the amount of growth of culture, various percentages may be used. However, from a practical standpoint it is usually desirable to use an amount of not less than 9% and not more than 50% yoghurt powder in making an instant yoghurt product.

Tetra sodium hypophosphate may be used in a percentage of 0.5% if it becomes desirable to make a stiffer product. Larger percentages may affect the flavor undesirably, and if the product is sufficiently stiff without the sodium pyrophosphate it may be eliminated from the formula.

Sugar and other flavoring materials are added in sufficient quantity to achieve desirable flavor adjunctive effects. Granulated sugar, in addition to its flavoring characteristics, acts as an additional stiffener.

The following examples are given to further illustrate the present invention. The scope of the invention is, however, not meant to be limited to the specific details of the examples.

EXAMPLE 1

Part A

Standard yoghurt culture is obtained from the American Type Culture Collection at Bethesda, Maryland, for the purpose of implanting the original pure culture in milk.

Take 100 volumes of skimmed milk at a temperature of 37° C. and take one volume of yoghurt culture which has been prepared in the following manner: Implant 100 ml. of skimmed milk with 4 loopfuls of yoghurt culture obtained from an agar slant. Incubate at 37° C. for 48 hours. After the first batch of this implanted growth has been obtained future implants may be made by taking 25 ml. of uncultured skimmed milk to make further cultures for final implants. When the larger 100 volume batch has incubated for not more than 12 hours it is reduced in volume by evaporation, then placed in vacuum driers until all moisture has been substantially removed. The product is then powdered.

Part B

The above prepared powder is used in the following formula for plain yoghurt lightly flavored with vanilla:

| | Grams |
|---|---|
| Skimmed milk powder | 95 |
| Dextrose | 45 |
| Calcium acetate | 1.8 |
| Starch | 45 |
| Coconut oil | 25 |
| Sodium alginate | 2.4 |
| Vanilla extract, q.s. | |
| Citric acid | 4 |
| Yoghurt powder | 48 |

The dry powders are thoroughly comminuted. The vanilla extract and coconut oil were worked into the powder by means of a comminuting sieve.

The powder prepared as above in a 66 gram portion is sufficient to make approximately ½ pint by volume of instant yoghurt. Five ounces of water may be added in small portions with constant stirring to obtain smoothness. A higher degree of creaminess may be obtained by the use of an egg beater or an electric mixer running at slow speed. Should a thinner product be desired more water may be added.

EXAMPLE 2

Part A

The preparation is made in accordance with directions given in Example 1, Part A, except that instead of 100 volumes of skimmed milk 50 volumes is used of a milk which is prepared from 100 parts of non-fat dried milk and 500 parts of water.

Part B

The above prepared powder is used in the following formula for orange flavored yoghurt:

| | Grams |
|---|---|
| Skimmed milk powder | 120 |
| Dextrose | 90 |
| Calcium acetate | 3.6 |
| Starch | 55 |
| Corn oil | 50 |
| Sodium alginate | 4.8 |
| Orange flavor, q.s. | |
| Citric acid | 5 |
| Yoghurt powder | 96 |
| Sugar | 30 |

The powder prepared as above in a 66 gram portion is sufficient to make approximately ½ pint by volume of instant yoghurt. Six ounces of water may be added in small portions with constant stirring to obtain smoothness. A higher degree of creaminess may be obtained by the use of an egg beater or an electric mixer running at slow speed. Should a thinner product be desired more water may be added.

EXAMPLE 3

Part A

Standard yoghurt culture is obtained from the American Type Culture Collection at Bethesda, Maryland, for the purpose of implanting the original pure culture in milk.

Take 100 volumes of whole milk at a temperature of 37° C. and take one volume of yoghurt culture which has been prepared in the following manner:

Implant 100 ml. of whole milk with 4 loopfulls of yoghurt culture obtained from an agar slant. Incubate at 37° C. for 48 hours. After the first batch of this implanted growth has been obtained future implants may be made by taking 25 ml. of uncultured whole milk to make further cultures for final implants. When the larger 100 volume batch has incubated for not more than 12 hours it is reduced in volume by evaporation, then placed in vacuum driers until all moisture has been substantially removed. The product is then powdered.

Part B

The above prepared powder is used in the following formula for pineapple flavored yoghurt:

| | Grams |
|---|---|
| Skimmed milk powder | 70 |
| Lactose | 25 |
| Saccharose | 15 |
| Calcium acetate | .6 |
| Starch | 30 |
| Tetra sodium pyrophosphate | 1 |
| Coconut oil | 10 |
| Sodium alginate | .5 |
| Artificial pineapple flavor, q.s. | |
| Citric acid | 1 |
| Yoghurt powder | 24 |
| Sugar | 30 |

The powder prepared as above in a 66 gram portion is sufficient to make approximtaely ½ pint by volume of instant yoghurt. Five ounces of water may be added in small portions with constant stirring to obtain smoothness. A higher degree of creaminess may be obtained by the use of an egg beater or an electric mixer running at slow speed. Should a thinner product be desired more water may be added.

EXAMPLE 4

Part A

Prepare yoghurt in accordance with Part A of Example 1.

Part B

The following formula is combined on a substantially dry bassis: Dry yoghurt prepared in accordance with Part A, above, 50 grams, coconut oil 25 grams, dried cooked starch 45 grams, flavor q.s. Approximately 30 grams of the above is combined with 5 ounces of water to make yoghurt by stirring with a suitable implement such as an egg beater for approximately one minute.

The foregoing examples are merely to illustrate the present invention and it will be obvious to one skilled in the art that various modifications and changes may be introduced without departing from the spirit of the invention. The examples given are not intended to limit but merely to illustrate the invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An instant yoghurt product adapted when mixed with water to form a synthetic yoghurt composition, said product comprising dried yoghurt culture, a water-soluble dried milk, an edible fat and a water-soluble dried starch.

2. An instant yoghurt product adapted when mixed with water to form a synthetic yoghurt composition, said product comprising dried yoghurt culture, a water-soluble dried milk, an edible vegetable oil and a water-soluble dried starch.

3. An instant yoghurt product adapted when mixed with water to form a synthetic yoghurt composition, said product comprising dried yoghurt culture, a water-soluble dried skimmed milk, an edible fat and a water-soluble precooked dried starch.

4. An instant yoghurt product adapted when mixed with water to form a synthetic yoghurt composition, said product comprising dried yoghurt culture, a water-soluble dried skimmed milk, an edible vegetable oil and a water-soluble precooked dried starch.

5. An instant yoghurt product adapted when mixed with water to form a synthetic yoghurt composition, said product comprising dried yoghurt culture, water-soluble dried skimmed milk, an edible vegetable oil in an amount sufficient to correspond to about one-half the fat content of natural milk, and a water-soluble dried precooked starch.

6. An instant yoghurt product adapted when mixed with water to form a synthetic yoghurt composition, said product comprising dried yoghurt culture, water-soluble dried skimmed milk, an edible vegetable oil in an amount sufficient to correspond to about one-half the fat content of natural milk, a sugar, and a water-soluble dried precooked starch.

7. An instant yoghurt product adapted when mixed with water to form a synthetic yoghurt composition, said product comprising dried yoghurt culture, water-soluble dried skimmed milk, an edible vegetable oil in an amount sufficient to correspond to about one-half the fat content of natural milk, dextrose, and a water-soluble dried precooked starch.

8. An instant yoghurt product adapted when mixed with water to form a synthetic yoghurt composition, said product comprising about 9–50% of dried yoghurt culture, about 20–50% of a water-soluble dried milk, an edible fat in an amount sufficient to correspond to about one-half the fat content of natural milk and about 10–25% of a water-soluble dried starch.

9. An instant yoghurt product adapted when mixed with water to form a synthetic yoghurt composition, said product comprising about 9–50% of dried yoghurt culture, about 20–50% of water-soluble dried skimmed milk, an edible vegetable oil in an amount sufficient to correspond to about one-half the fat content of natural milk, and about 10–25% of a water-soluble dried precooked starch.

10. An instant yoghurt product adapted when mixed with water to form a synthetic yoghurt composition, said product comprising about 18% of dried yoghurt culture, about 35% of water-soluble dried skimmed milk, an edible vegetable oil in an amount sufficient to correspond to about one-half the fat content of natural milk, and about 18% of a water-soluble dried precooked starch.

References Cited in the file of this patent

UNITED STATES PATENTS

| | | |
|---|---|---|
| 1,230,452 | Wiley | June 19, 1917 |
| 2,213,283 | Kronberg | Sept. 3, 1940 |

FOREIGN PATENTS

| | | |
|---|---|---|
| 840,568 | Great Britain | July 6, 1960 |